(12) United States Patent
Zhou et al.

(10) Patent No.: US 8,635,636 B2
(45) Date of Patent: Jan. 21, 2014

(54) OPTICAL RECORDING APPARATUS WITH LIMITING MEMBERS FOR THE FLEXIBLE CABLE

(75) Inventors: Xiao-Hui Zhou, Shenzhen (CN); Hong Li, Shenzhen (CN); Hai-Tao Wang, Shenzhen (CN); Ren-Wen Wang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 46 days.

(21) Appl. No.: 13/494,939

(22) Filed: Jun. 12, 2012

(65) Prior Publication Data
US 2012/0327170 A1 Dec. 27, 2012

(30) Foreign Application Priority Data
Jun. 24, 2011 (CN) .......................... 2011 1 0172823

(51) Int. Cl.
*G11B 33/12* (2006.01)
*H01R 12/00* (2006.01)

(52) U.S. Cl.
USPC .......................................... 720/652; 439/492

(58) Field of Classification Search
CPC .... G11B 33/122; G11B 33/121; G11B 33/12; G11B 33/123; H01R 13/5804
USPC ..................... 720/652, 653; 439/95, 492–493
See application file for complete search history.

(56) References Cited

U.S. PATENT DOCUMENTS

| 5,566,050 | A * | 10/1996 | Seto et al. ................. 361/679.43 |
| 5,694,314 | A * | 12/1997 | Aoki et al. ..................... 720/652 |
| 5,737,292 | A * | 4/1998 | Honda et al. .................. 720/652 |
| 7,186,136 | B2 * | 3/2007 | Tiesler et al. ................. 439/493 |
| 7,410,387 | B2 * | 8/2008 | Howard et al. ............... 439/449 |
| 7,428,192 | B2 * | 9/2008 | Ochi et al. ................. 369/44.14 |
| 7,703,110 | B2 * | 4/2010 | Murakami et al. ............ 720/653 |
| 8,117,627 | B2 * | 2/2012 | Gotoh et al. .................. 720/601 |
| 8,151,286 | B2 * | 4/2012 | Morisono ..................... 720/652 |
| 8,302,116 | B2 * | 10/2012 | Yeh et al. ...................... 720/652 |
| 8,336,064 | B2 * | 12/2012 | Masuda ........................ 720/655 |
| 2004/0233564 | A1 * | 11/2004 | Kim ................................ 360/39 |
| 2004/0235322 | A1 * | 11/2004 | Hooper .......................... 439/95 |
| 2005/0076346 | A1 * | 4/2005 | Matsumoto et al. .......... 720/601 |
| 2007/0186225 | A1 * | 8/2007 | Asabata ........................ 720/652 |
| 2010/0180286 | A1 * | 7/2010 | Wu et al. ....................... 720/606 |
| 2011/0258651 | A1 * | 10/2011 | Hu et al. ....................... 720/695 |

* cited by examiner

*Primary Examiner* — Brian Miller
(74) *Attorney, Agent, or Firm* — Altis Law Group, Inc.

(57) ABSTRACT

An optical recording apparatus includes a traverse, a control circuit board, a shield substrate and an flexible flat cable (FFC). The traverse includes a spindle motor for rotating an optical disc and an optical pickup head for reading and/or writing the optical disc, the optical pickup head moves along a radial direction of the optical disc when reading and/or writing the optical disc. The FFC electrically connects the optical pickup head and the control circuit board and transmits signals between them, and a portion of the FFC adjacent to the second end is bent to facing the shield substrate. The shield substrate includes at least two limiting members, and the at least two limiting members are positioned at two opposite sides of the portion of the FFC facing the shield substrate to enable the portion of the FFC facing the shield substrate to move along the first direction.

19 Claims, 5 Drawing Sheets

OPTICAL RECORDING APPARATUS WITH LIMITING MEMBERS FOR THE FLEXIBLE CABLE

BACKGROUND

1. Technical Field

The present disclosure generally relates to an optical recording apparatus for reading and/or writing an optical disc, and more particularly, to an optical recording apparatus with limiting members.

2. Description of Related Art

Many optical recording apparatus include an optical pickup head, a control circuit board, and a flexible flat cable (FFC) transmitting signals between the optical pickup head and the control circuit board. The optical pickup head reads and/or writes a disc while moving across the disc. Two opposite ends of the FFC are connected to the optical pickup head and the control circuit board, correspondingly. One end of the FFC is connected to the control circuit board which is fixed, and the other end of the FFC is connected to the optical pickup head and may move with the optical pickup head. Normally, a section of the FFC adjacent to the control circuit board is tightly adhered to a shield substrate to limit movement of the section of the FFC adjacent to the control circuit board.

However, it is problematic and inconvenient for an operator to re-assemble the tightly adhered section of the FFC when the FFC is damaged, and this kind of re-assembly of the optical recording and/or reproducing apparatus is inconvenient and time-consuming, and adds to the cost of mass manufacturing the optical recording apparatus.

What is needed, therefore, is a means which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will be made to the drawings to describe the embodiments in detail.

Figure 1:
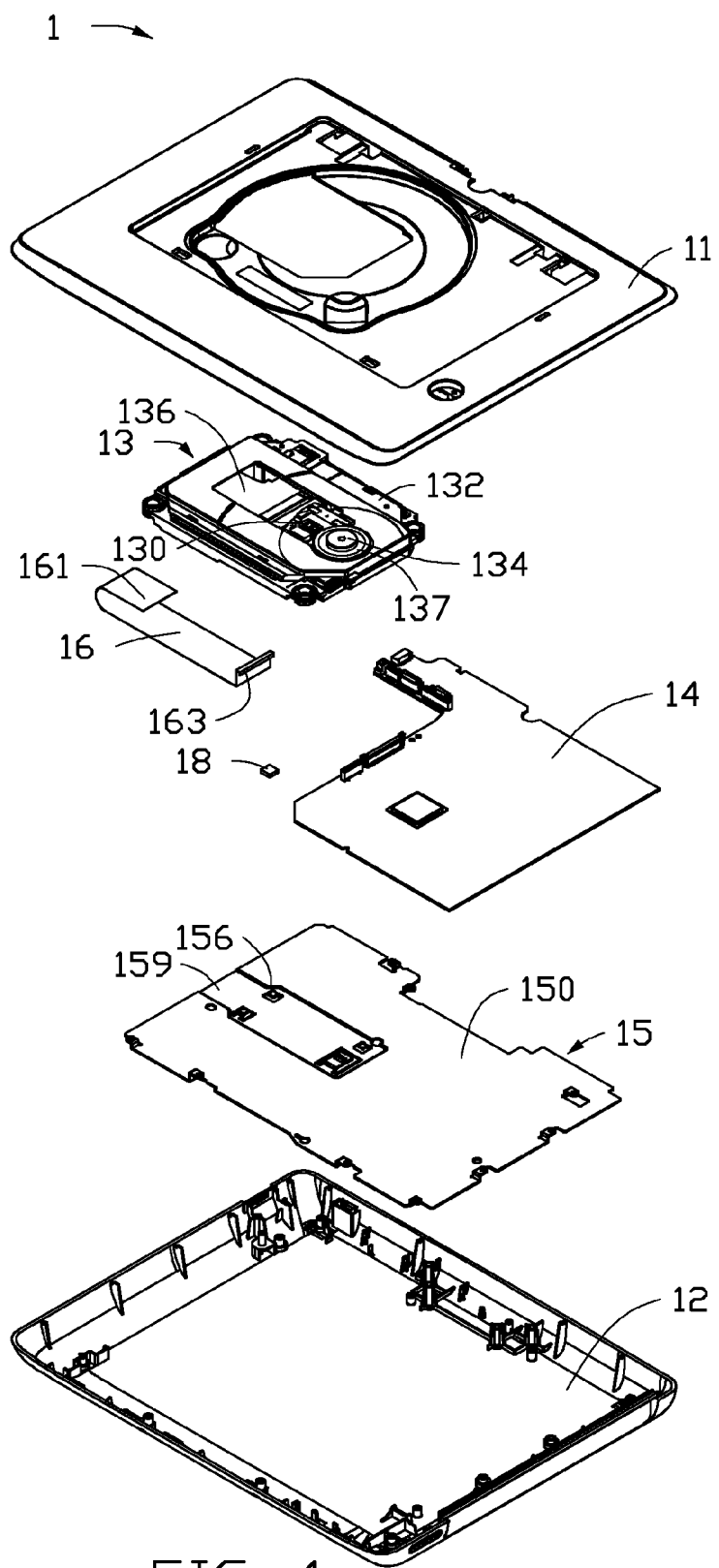
FIG. 1 is an isometric, exploded view of an optical recording apparatus in accordance with an exemplary embodiment, the optical recording apparatus including a control circuit board, a shield substrate and a FFC.

FIG. 1 is an optical recording apparatus 1 in accordance with an exemplary embodiment. The optical recording apparatus 1 includes a top frame 11, a bottom frame 12, a traverse 13, a control circuit board 14, a shield substrate 15 and an FFC 16. The top frame 11 and the bottom frame 12 cooperatively define a space to accommodate the traverse 13, the control circuit board 14, the shield substrate 15 and the FFC 16. The traverse 13 and the control circuit board 14 are mounted on the shield substrate 15 side by side.

The traverse 13 includes an optical pickup head 130, a bearing base 132, and a spindle motor 134. The bearing base 132 defines an opening 136 extending, along a first direction. The spindle motor 134 is rotatably mounted on the bearing base 132 and exposed from the opening 136. A top of the spindle motor 134 forms a turntable 137. The turntable 137 is used to fix and rotate an optical disc arranged on an annular supporting surface of the turntable 137. The first direction is parallel to a radial direction of the turntable 137. The optical pickup head 130 is movably engaged in the opening 136, and configured to move back or forth along the opening 136. When the optical pickup head 130 moves along the first direction and across, the optical disc rotates on the turntable 137, the optical pickup head 130 can read and/or write to the optical disc.

The FFC 16 transmits signals between the optical pickup head 130 and the control circuit board 14. The FFC 16 includes a first end 161 and a second end 163 opposite to the first end 161. The first end 161 is connected to the optical pickup head 130, and the second end 163 is connected to the control circuit board 14. A first portion of the FFC 16 adjacent to the first end 161 is received in the opening 136. A second portion of the FFC 16 adjacent to the second end 163 is bent to the rear of the bearing base 132 to face the shield substrate 15.

Figure 2:
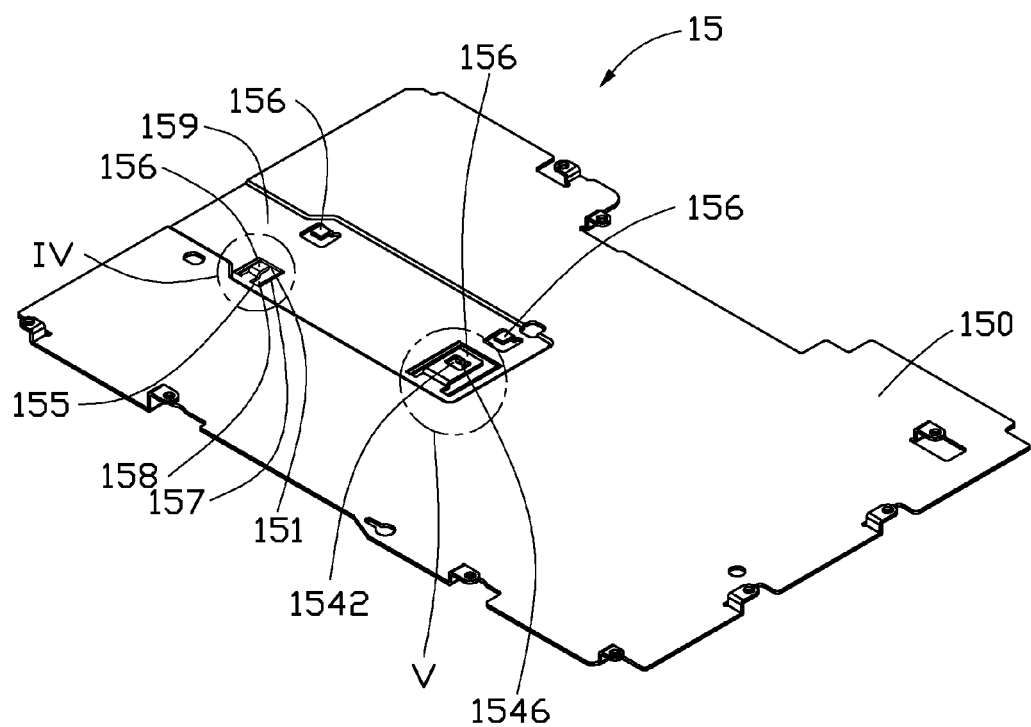
FIG. 2 is an isometric view of the shield substrate of FIG. 1.
Figure 3:
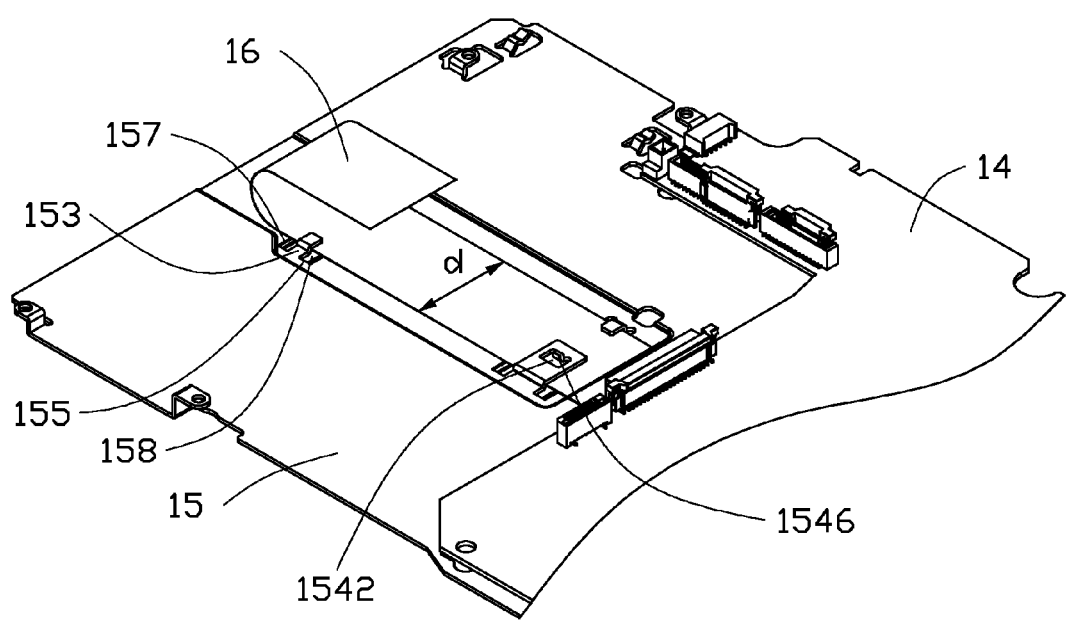
FIG. 3 is an assembly view of the control circuit board, the shield substrate and the FFC of FIG. 1.
Figure 4:
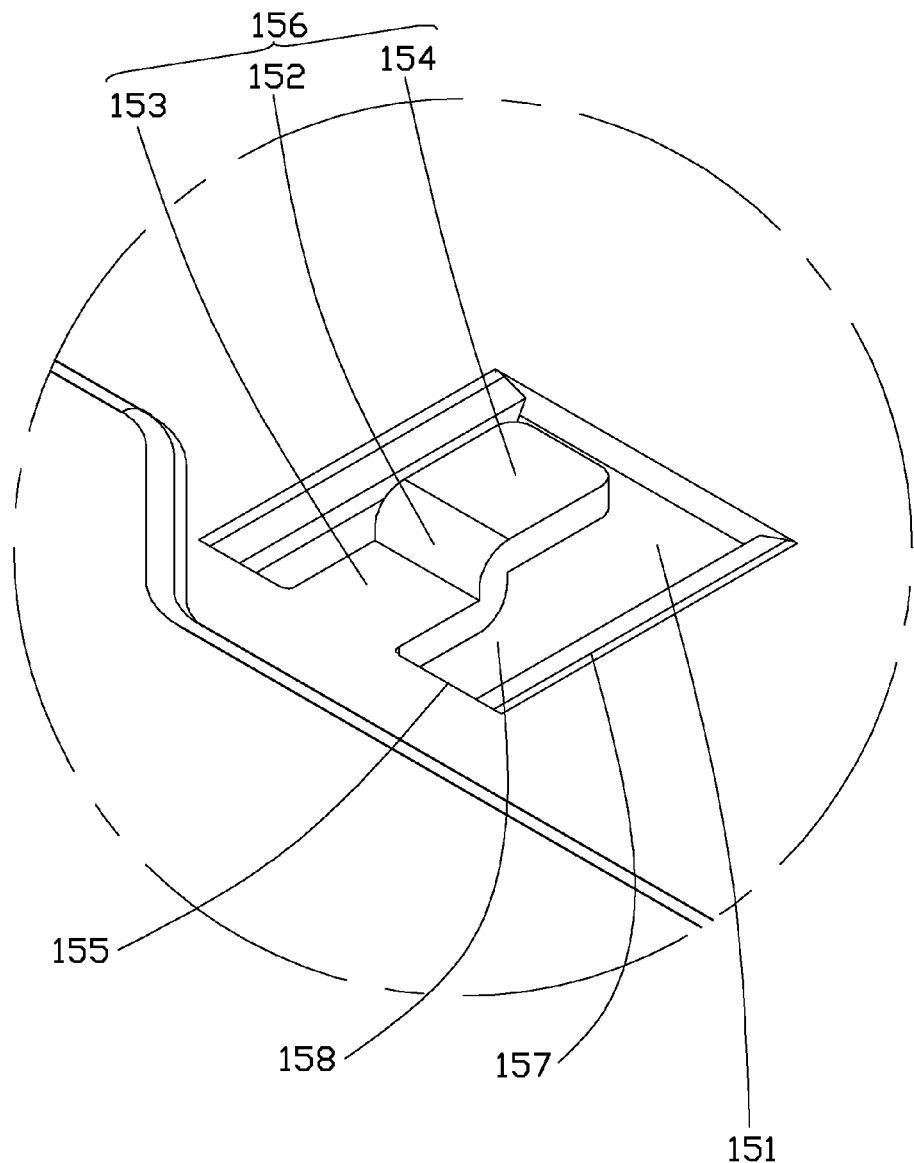
FIG. 4 is an enlarged, isometric view of a circled portion IV of the optical recording apparatus of FIG. 2.
Figure 5:
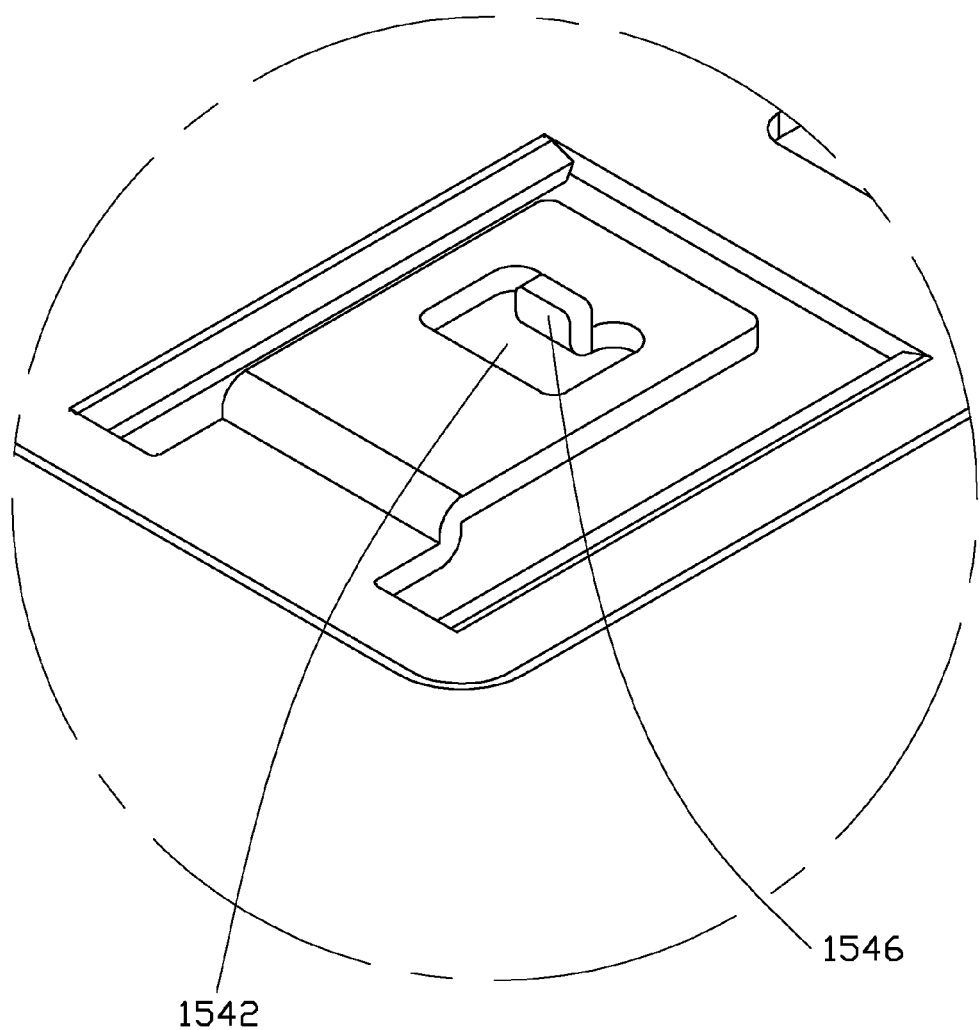
FIG. 5 is an enlarged, isometric view of a circled portion V of the optical recording apparatus of FIG. 2. No new matter has been added.

Referring also to FIG. 2, FIG. 4, and FIG. 5, the shield substrate 15 includes a bottom plate 150, and the bottom plate 150 includes a fixing region 159 corresponding to the opening 136 to receive the second portion of the FFC 16 facing the shield substrate 15 and at least two limiting members formed in the fixing region 159 to limit the FFC 16 to only move in the fixing region 159 along the first direction. In the illustrated embodiment, the shield substrate 15 includes four limiting members 156. The fixing region 159 includes an accommodating groove defined in the bottom plate 150. In the embodiment, a depth of the accommodating groove is substantially equal to a thickness of the FFC 16. The fixing region 159 further includes four mounting holes 151 defined at a bottom of the accommodating groove. In the embodiment, each mounting hole 151 is rectangle and includes two first sides 155 parallel to the first direction, and two second sides 157 perpendicular to the first direction. Each limiting member 156 extends from a corresponding one of the two first sides 155 of each mounting hole 151.

Each limiting member 156 includes an extending portion 153, a resistant portion 152, and a pressing portion 154. The extending portion 153 extends horizontally from the corresponding one of the two first sides 155 of the mounting hole 151, the pressing portion 154 is substantially parallel to the extending portion 153, and the resistant portion 152 perpendicularly interconnects the extending portion 153 and the pressing portion 154. A crossing line where the extending portion 153 meets the resistant portion 152 is parallel to the first direction. The extending portion 153 and the pressing portion 154 of each limiting member 156 are located at two opposite sides of the resistant portion 152.

The four mounting holes 151 can be designed to have a same size or have a different size, the four limiting members 156 can be designed to have a different size as shown in FIG. 2 or have a same size. In the embodiment, one of the four limiting members 156 has a bigger size than the other three limiting members 156, and a conductive foam 18 which is attached to the spindle motor 134 can be adhered on a top surface of the pressing portion 154 of the limiting member 156 which has the bigger size, as a result, static electricity from the spindle motor 134 can be grounded via the conductive foam 18 and the shield substrate 15. Further, the top surface of the pressing portion 154 of the limiting member 156 which has the bigger size defines a through hole 1542, and a rib 1546 extends from periphery of the through hole 1542 to strengthen the adhesion between the pressing portion 154 and the conductive foam 18.

The four resistant portions 152 of the four limiting members 156 are arranged at two opposite sides of the accommodating groove and arranged in two rows to align with the two opposite sides of the FFC 16. A distance perpendicular to the first direction and between the two rows formed by the four resistant portions 152 is substantially equal to or slightly wider than a width of the FFC 16, thereby defining a moving rail for the FFC 16. The pressing portion 154 and the resistant portion 152 of each limiting member 156 define an entrance to mount the FFC 16. A length of the corresponding one of the two first sides 155 of each mounting hole 151 is longer than a length of the extending portion 153 connected to the corresponding one of the two first sides 155 of each mounting hole 151, and as a result, two receiving spaces 158 are formed between the extending portion 153 and the two second sides 157 of the mounting hole 151.

In assembly, a side of the FFC 16 is inserted into the entrances defined by the limiting members 156 arranged in one of the two rows, and the opposite side of the FFC 16 is inserted into the entrances defined by the limiting members 156 arranged in the other one of the two rows. The two sides of the FFC 16 abut against the resistant portions 152 arranged in two rows, correspondingly, and the FFC 16 may move along the moving rail defined by the resistant portions 152 of the limiting members 156. The traverse 13 and the control circuit board 14 are mounted on the shield substrate 15 side by side. The second end 163 of the FFC 16 is connected to the control circuit board 14, and the portion of the FFC 16 adjacent to the second end 163 is located between the rear of the bearing base 132 and the shield substrate 15, and the portion of the FFC 16 adjacent to the first end 161 is bent to be received in the opening 136, and the first end 161 of the FFC 16 is connected to the optical pickup head 130 of the traverse 13.

Because two receiving spaces 158 are formed between the extending portion 153 and the two second sides 157 of each mounting hole 151, when the one side of the FFC 16 is inserted into the entrances defined by the limiting members 156 arranged in one of the two rows, the FFC 16 can be pushed to move continuously into the receiving spaces 158, to increase the distance between the other side of the FFC 16 and the resistant portions 152 arranged in the other one of the two rows, thus the other side of the FFC 16 can be easily inserted into the entrances defined by the limiting members 156 arranged in the other one of the two rows. The position of the FFC 16 received in the fixing region 159 is then adjusted to make the two sides of the FFC 16 abut against the resistant portions 152 arranged in two rows, correspondingly. Similarly, when FFC 16 is removed from the limiting members 156, one side of the FFC 16 can be pushed to move into corresponding receiving spaces 158, thus increasing the distance between the other side of the FFC 16 and the resistant portion 152 arranged in the other one of the two rows, and the other side of the FFC 16 can be easily removed from the entrances defined by the limiting members 156 arranged in the other one of the two rows.

With the above-described configuration, the FFC 16 can be quickly and securely engaged in the limiting members 156. Similarly, the FFC 16 can be quickly and safely removed from the limiting members 156. And due to the limiting members 156 limiting the movement of the FFC 16, the risk of the FFC 16 being damaged is relatively low.

The optical recording apparatus 1 herein is not limited to the above-described embodiments. For example, in alternative embodiments, the optical recording apparatus 1 can includes two, three or more limiting members 156 located at two opposite sides of the FFC 16. In other embodiments, each limiting member 156 only includes the resistant portion 152 and the pressing portion 154 to limit the movement of the FFC 16, the resistant portion 152 perpendicularly extends from the bottom of the accommodating groove and is parallel to the first direction, the pressing portion 154 connects to the resistant portion 152, and the pressing portion 154 and the resistant portion 152 ensure the FFC 16 move along the first direction. The shapes of the limiting members 156 can be configured according to particular requirements.

It is believed that the present embodiments and their advantages will be understood from the foregoing description, and it will be apparent that various changes may be made thereto without departing from the spirit and scope of the embodiments or sacrificing all of their material advantages.

What is claimed is:

1. An optical recording apparatus, comprising:
    a traverse comprising a spindle motor for rotating an optical disc and an optical pickup head for reading and/or writing the optical disc when the optical pickup head is driven to move along a first direction parallel to a radial direction of the optical disc;
    a control circuit board;
    a flexible flat cable (FFC) for transmitting signals between the optical pickup head and the control circuit hoard, the FFC comprising a first end connected to the optical pickup head and a second end connected to the control circuit board; and
    a shield substrate comprising at least two limiting members;
    wherein a portion of the FFC adjacent to the second end is bent to face the shield substrate, and the at least two limiting members are positioned at two opposite sides of the FFC to limit a portion of FFC to move along the first direction.

2. The optical recording apparatus of claim 1, wherein the traverse further comprises a bearing base, the bearing base defines an opening extending along the first direction, the spindle motor is fixed to the bearing base, and the optical pickup head is movably engaged in the opening.

3. The optical recording apparatus of claim 2, wherein the shield substrate comprises a bottom plate, the bottom plate comprises a fixing region corresponding to the opening of the bearing base, and the at least two limiting members are positioned in the fixing region of the bottom plate.

4. The optical recording apparatus of claim 3, wherein the fixing region is an accommodating groove defined in the fixing region of the bottom plate, the portion of the FFC facing the shield substrate is received in the accommodating groove, and a depth of the accommodating groove is substantially equal to a thickness of the FFC.

5. The optical, recording apparatus of claim 4, wherein the bottom of the accommodating groove defines at least two mounting holes, each limiting member extends from a side of a corresponding one of the at least two mounting holes.

6. The optical recording apparatus of claim 5, wherein each limiting member comprises an extending portion, as resistant portion and a pressing portion, the extending portion extends horizontally from the side of the corresponding one of the at least two mounting holes, the pressing portion parallel to the extending portion, the resistant portion interconnects the extending portion and the pressing portion, a crossing line where the resistant portion meets the extending portion is parallel to the first direction, and the pressing portion, the resistant portion, and the bottom of the accommodating groove form an entrance to mount the FFC.

7. The optical recording apparatus of claim 6, wherein a distance between two adjacent resistant portions arranged at two opposite sides of the FFC is substantially equal to a width of the FFC.

8. The optical recording apparatus of claim 7, wherein the mounting holes are rectangle holes, each mounting hole includes two first sides parallel to the first direction and two second sides perpendicular to the first direction, and the extending portion of each limiting member extends horizontally from a corresponding one of the two first sides of each mounting hole.

9. The optical recording apparatus of claim 8, wherein a length of the corresponding one of the first side of each mounting hole is longer than a length of the extending portion connected to the corresponding one of the first side, two receiving spaces are formed between the extending portion and the two second sides of the corresponding one of the at least two mounting holes.

10. The optical recording apparatus of claim 5, wherein the shield substrate defines four mounting holes and comprises four limiting members, and one of the four limiting members is configured to attach a conductive foam for resisting the spindle motor, and the spindle motor is grounded via the conductive foam and the shield substrate.

11. An optical recording apparatus, comprising:
a bearing base;
a spindle motor fixed to the bearing base for supporting and rotating an optical disc;
an optical pickup head being movable mounted to the bearing base for reading and/or writing the optical disc when the optical pickup head is driven to move along a first direction parallel to a radial direction of the optical disc;
a control circuit board;
a shield substrate comprising at least two limiting members; and
a flexible that cable (FFC) electrically connected to the optical pickup head and the control circuit board for transmitting signals between the optical pickup head and the control circuit hoard, a portion of the FFC adjacent to the control circuit board bent to face the shield substrate, the at least two limiting members being positioned at two opposite sides of the portion of the FFC facing the shield substrate to enable the portion of FFC facing the shield substrate to move along the first direction when the FFC moves in union with the optical pickup head.

12. The optical recording apparatus of claim 11, wherein the bearing base defines an opening extending along the first direction, the spindle motor fixed to the bearing base at an end of the opening, and the optical pickup head is movably engaged in the opening.

13. The optical recording apparatus of claim 12, wherein the shield substrate comprises a bottom plate, the bottom plate comprises a fixing region corresponding to the opening of the bearing base, and the at least two limiting members are positioned in the fixing region.

14. The optical recording apparatus of claim 13, wherein the fixing region is an accommodating groove formed on the bottom plate, the portion of the FFC facing the shield substrate is received in the accommodating groove.

15. The optical recording apparatus of claim 14, wherein the shield substrate comprised four limiting members, two limiting members are arranged at one side of the FFC, and the other two limiting members are arranged at the opposite side of the FFC, the bottom of the accommodating groove defines four mounting holes, and each limiting member extends from a side of a corresponding one of the four mounting holes.

16. The optical recording apparatus of claim 15, wherein each limiting member comprises an extending portion, to resistant portion and a pressing portion, the extending portion extends horizontally from the side of the corresponding one of the four mounting holes, the pressing portion parallel to the extending portion, and the resistant portion interconnects the extending portion and the pressing portion, a crossing line where the resistant portion meets the extending portion is parallel to the first direction, and the pressing portion, the resistant portion, and the bottom of the accommodating groove form an entrance to mount the FFC.

17. The optical recording apparatus of claim 16, wherein the four resistant portions of the four limiting members are arranged in two rows to align with the two opposite sides of the FFC, and a distance between the two rows formed by the four resistant portions is substantially equal to a width of the FFC.

18. The optical recording apparatus of claim 17, wherein the mounting holes are rectangle holes, each mounting hole includes two sides parallel to the first direction and two sides perpendicular to the first direction, the extending portion of each limiting member extends horizontally from a corresponding one of the two sides parallel to the first direction of each mounting hole, a length of the corresponding one of the two side parallel to the first direction of each mounting hole is longer than a length of the extending portion connected to the corresponding one of the two sides of each mounting hole, and two receiving spaces are formed between the extending portion and the two sides of the corresponding one of the four mounting holes.

19. The optical recording apparatus of claim 18, wherein one of the four limiting members comprises a bigger size than the other three limiting members, a conductive foam attached to the spindle motor is adhered on a top surface of the pressing portion of the bigger size limiting member, and the spindle motor is grounded via the conductive foam and the shield substrate.

* * * * *